ative ingredients.

2,953,490

PROPYLAMINE FUNGICIDES

George F. Deebel, Dayton, Ohio, assignor to Monsanto Chemical Company, St. Louis, Mo., a corporation of Delaware No Drawing. Filed Mar. 14, 1957, Ser. No. 645,906

3 Claims. (Cl. 167—30)

This invention relates to amines and more particularly provides certain new and valuable halogenated aryl alkyl diamines, the method of preparing the same, and fungicidal compositions comprising the diamines as the essential effective ingredients.

According to the invention there are prepared 3-(Chloroanilino)propylamines by the reaction of β-(Chloroanilino)propionitriles with hydrogen under pressure and in the presence of a hydrogenation catalyst, substantially according to the scheme:

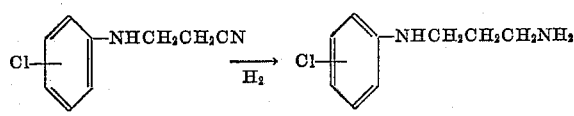

Examples of hydrogenation catalysts useful for the present purpose are, finely divided nickel, iron, cobalt or tungsten or evaporated films thereof; palladium or its compounds; platinum black; copper chromite; or other conventional hydrogenation catalysts. Advantageously, the catalyst may be a Raney nickel catalyst which is a finely divided nickel prepared by dissolving the aluminum out of a Raney alloy, e.g., an alloy consisting of 30% nickel and 70% aluminum. Raney cobalt catalyst which is a finely divided cobalt prepared by dissolving the aluminum out of a cobalt-aluminum alloy is particularly useful.

The hydrogenation is preferably carried out at elevated temperatures, for example, above 100° C. and in some cases as high as 200° C. It is usually conducted until approximately the maximum amount of hydrogen has been absorbed, which may require from, say, one to twenty-four hours, depending upon the operating conditions. In this process one mole of the β-(chloroanilino) propionitrile reacts with two moles of the hydrogen to yield one mole of the 3-(chloroanilino)propylamine, and the reactants may be employed in such stoichiometric proportions. However, the proportion of the reactants may be varied since any unreacted nitrile and/or incompletely hydrogenated product may be separated from the amine product, e.g., by distillation.

The reaction is usually conducted in the presence of a solvent such as, for example, methanol, ethanol, acetic acid, ethylene glycol or alkyl ethers thereof such as 1,2-dimethoxyethane, tetrahydrofuran, etc.

The reaction is also preferably conducted in an autoclave or other closed vessel capable of withstanding high pressures and adapted to maintain the contents in an agitated condition. Thus, stirred autoclaves or autoclaves with rocking or tumbling mechanisms are useful. Pressures of at least 500 p.s.i. and preferably of from 1500 to 3500 p.s.i. are advantageously employed. The hydrogenation may be effected batchwise or continuously. Generally, the pressure vessel is charged with β-(chloroanilino)propionitrile, the inert diluent or solvent and catalyst, and gaseous hydrogen is conducted into the mixture of nitrile, diluent and catalyst at ordinary or decreased temperatures until the optimum pressure is developed. Heating is then initiated. During the heating additional hydrogen may be introduced as it is consumed in the reaction.

The present 3-(chloroanilino)propylamines are stable, well-characterized products which are useful for a number of industrial and commercial purposes, e.g., as plasticizing agents for synthetic resins and plastics, as lubricant additives and as intermediates in the manufacture of pharmaceuticals. They are particularly useful as biological toxicants, possessing very good activity against fungi and bacteria.

The invention is further illustrated, but not limited, by the following examples:

Example 1

A 3-liter rocking bomb containing 1000 g. of β-(2-chloroanilino)propionitrile, 1000 ml. of 1,2-dimethoxyethane and 50 g. of Raney cobalt catalyst (prepared by dissolving the aluminum out of an alloy consisting of 40% of cobalt and 60% of aluminum) was charged with hydrogen to a pressure of 2,000 p.s.i., and the resulting mixture was heated, with rocking, from an initial temperature of 27° C. to a peak temperature of 160° C. within about one hour and then at a temperature of down to 115° C. for another hour and 20 minutes. During this period the hydrogen pressure rose from 2,000 to 2,300 p.s.i. within the first 40 minutes of heating, was maintained at about 2,100 p.s.i. for the ensuing 12 minutes and then allowed to fall to 300 p.s.i. by the time the peak temperature (160° C.) had been obtained. With the fall in temperature to 132° C. (1 hour and 20 minutes after initiation of the run), the pressure was increased to 1850 p.s.i. and was allowed to remain at 1,800 to 1,950 p.s.i. until heating was discontinued (total heating time of 2 hours and 13 minutes). The bomb and its contents were then allowed to cool to 50° C., at which time a pressure of 1,500 lbs. was noted. The bomb was then vented and the contents thereof transferred with an additional 500 ml. of 1,2-dimethoxyethane to a flask and filtered. Distillation of the filtrate through a packed column, first at atmospheric pressure to remove the 1,2-dimethoxyethane, and then under partial pressure gave 854.7 g. of the crude product, B.P. 95–119° C./0.1–0.25 mm. This was redistilled to give 555 g. of the substantially pure 3-(2-chloroanilino)propylamine, B.P. 94–105° C. (mainly 95–98° C.)/0.07 to 0.4 mm.

Example 2

To a 1-liter rocking bomb there was charged 250 g. of β-(2-chloroanilino)propionitrile, 250 ml. of 1,2-dimethoxyethane and 20 g. of the Raney cobalt catalyst of Example 1. Hydrogen was introduced to a pressure of 2,000 p.s.i. and heating was started. The temperature was raised from 26° C. to 125° C. within about 35 minutes, and heating at from 121° C. to 127° C. was continued for another 12 minutes. During the heating period a hydrogen pressure of from 2,100 to 2,300 p.s.i. was maintained. The bomb and its contents were then allowed to cool to a temperature of 35° C. and subsequently vented. The contents was transferred to a flask, using an additional 250 ml. of 1,2-dimethoxyethane, and the whole was saved for a combined distillation with the product of Example 3.

Example 3

The experiment of Example 2 was repeated, except that a total heating time of 1 hour and 12 minutes was used, the pressure was allowed to rise to a peak of 2,380 p.s.i. and the temperature to a peak of 129° C. After allowing the bomb and its contents to cool to 32° C., the reaction mixture was transferred from the bomb with an additional 250 ml. of 1,2-dimethoxyethane and combined with the similarly transferred product of Example 2.

Filtration of said combined products and distillation of the resulting filtrate at atmospheric pressure gave 900 ml. of 1,2-dimethoxyethane. Distillation of the residue in a packed column at reduced pressure gave 405 g. (98% theoretical yield based on the nitrile consumed) of the substantially pure 3-(2-chloroanilino)propylamine, B.P. 97–103° C./0.2–0.4 mm., $n_D^{25}$ 1.5755–9.

Example 4

A 1-liter, bottom-stirred stainless-steel autoclave was charged with 300 g. of β-(3-chloroanilino)propionitrile, 300 ml. of 1,2-dimethoxyethane and 30 g. of the Raney cobalt catalyst of Example 1. At an initial reaction mixture temperature of 12° C., hydrogen was introduced to a pressure of 3,000 p.s.i. and the reaction mixture was heated to a temperature of 135° C. within about one hour during which period additional hydrogen was introduced in order to maintain the pressure at from 2,975 to 2,990 p.s.i. Heating then continued for about an additional 50 minutes at 133° C.–135° C. The bomb and its contents were then allowed to cool to 20° C., at which point the pressure was 2,000 p.s.i. The contents was transferred with an additional 250 ml. of 1,2-dimethoxyethane and filtered. Distillation of the filtrate first at atmospheric pressure to remove the solvent and subsequently under partial vacuum gave the substantially pure 3-(2-chloroanilino)propylamine, B.P. 128° C./0.1–0.25 mm., $n_D^{25}$ 1.5790 (analyzing 15.51% nitrogen as against 15.15%, the calculated value for $C_9H_{13}N_2Cl$.

Example 5

A mixture consisting of 236 g. of β-(4-chloroanilino)propionitrile, 250 ml. of 1,2-dimethoxyethane and 25 g. of the Raney cobalt catalyst of Example 1, was charged to a 1-liter bomb, and hydrogen was introduced at a temperature of 15° C. to a pressure of 2,700 lbs. Heating was initiated and the temperature brought to 137° C. within about one hour, during which time the pressure fell to 2,300 p.s.i. The reaction mixture was allowed to cool to 15° C., the bomb was vented, and the contents thereof transferred with an additional 250 ml. of 1,2-diethoxyethane. After filtering and distilling the filtrate to remove the solvent, the residue was distilled through a 2′ x 1″ Vigreux column to give the substantially pure 3-(4-chloroanilino)propylamine, B.P. 132–144° C./0.6–1.0 mm., $n_D^{25}$ 1.5852, analyzing 15.01% nitrogen as compared with 15.15% the calculated nitrogen value for $C_9H_{13}N_2Cl$.

Example 6

The fungitoxicity of 3-(2-chloroanilino)propylamine was determined against spores of *Stemphyllium sarcinaeforme*, the causal organism of clover leaf spot and *Monilinia fructicola*, the causal organism of brown rot of stone fruits. An aqueous suspension containing 1,000 p.p.m. of the test compound was prepared and respective 0.02 ml. aliquots thereof were pipetted into respective wells of depressed glass slides. Then an 0.1 ml. aliquot of a spore suspension of one of the test organisms was pipetted into each well. The concentration of test chemical in each well was thus 200 p.p.m. The slides were then incubated in moist chambers for 24 hours at a temperature of 25° C. Inspection of the slides at the end of that time showed no spore germination in wells containing the 200 p.p.m. concentration of the 3-(2-chloroanilino)propylamine, whereas profuse germination was noted in "controls," i.e., wells containing the spore suspension in absence of any chemical.

Example 7

This example shows systemic fungicide testing of 3-(2-chloroanilino)propylamine.

Three two-week old Bonny Best tomato seedlings were immersed into water containing 10 parts by weight of said amine per million parts by weight of water. After 48 hours the seedlings were removed and the root systems were rinsed thoroughly in tap water to remove any chemical residue. Approximately one-third of the lateral root system of each plant was severed and the wounded roots were dipped for 30 seconds in a bud-cell suspension of the tomato wilt fungus *Fusarium oxysporum* f. *lycopersici*. The thus inoculated plants were then potted in 4-inch clay pots of steamed-soil. "Blanks" were prepared by similarly inoculating and potting tomato seedlings which had not been exposed to the test compound. The potted plants were then set in the greenhouse for observation.

Marked Fusarium wilt symptoms were noted on the "blanks," whereas the plants which had been treated with said amine at the 10 p.p.m. concentration appeared to be in excellent condition. At this time disease incidence was investigated by cross-sectioning the stem of each of the amine-treated and inoculated plants and examining them for vascular browning. No vascular discoloration was noted. Similar examination of the "blanks" showed pronounced browning.

The present amines may be applied as fungicides by any suitable method, for example as sprays or as dusts comprising an inert carrier which may be a liquid or a powdered solid. When used as sprays they may be employed in solution or in emulsion form. I have found that oil-in-water emulsions of the 3-(chloroanilino)propylamines possess an improved tendency to adhere to the treated organism and that less of the active ingredient, i.e., the amine, is required to give comparable fungitoxicity. The emulsions are readily prepared by first preparing a solution of the amine in an organic solvent and then adding the resulting solution to water containing an emulsifying agent to form an emulsion. Emulsifying agents which may be employed are those customarily used in the art for the preparation of oil-in-water emulsions. The word "oil" is here used to designate any organic liquid which is insoluble in water. Examples of emulsifying agents which may be used include alkyl benzene sulfonates, long chained polyalkylene glycols; long chained alkyl sulfosuccinates, etc.

What I claim is:

1. The method of inhibiting growth of fungi which comprises exposing the fungi to a toxic quantity of an amine of the formula

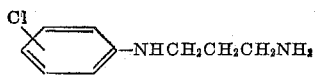

2. The method of inhibiting the growth of fungi which comprises exposing the fungi to a toxic quantity of 3-(2-chloroanilino)propylamine.

3. The method of inhibiting the development of wilt fungi on tomato plants which comprises treating said plants with a 3-(2-chloroanilino)propylamine.

References Cited in the file of this patent

UNITED STATES PATENTS

| | | |
|---|---|---|
| 2,122,781 | Salzberg | July 5, 1938 |
| 2,728,765 | Bernstein | Dec. 27, 1955 |
| 2,739,981 | Szabo et al. | Mar. 27, 1956 |
| 2,749,269 | Ligett et al. | June 5, 1956 |
| 2,827,467 | Ruschig et al. | Mar. 18, 1958 |
| 2,829,164 | Rocklin | Apr. 1, 1958 |

FOREIGN PATENTS

| | | |
|---|---|---|
| 729,332 | Great Britain | May 4, 1955 |
| 561,156 | Germany | Oct. 12, 1932 |